Patented May 8, 1934

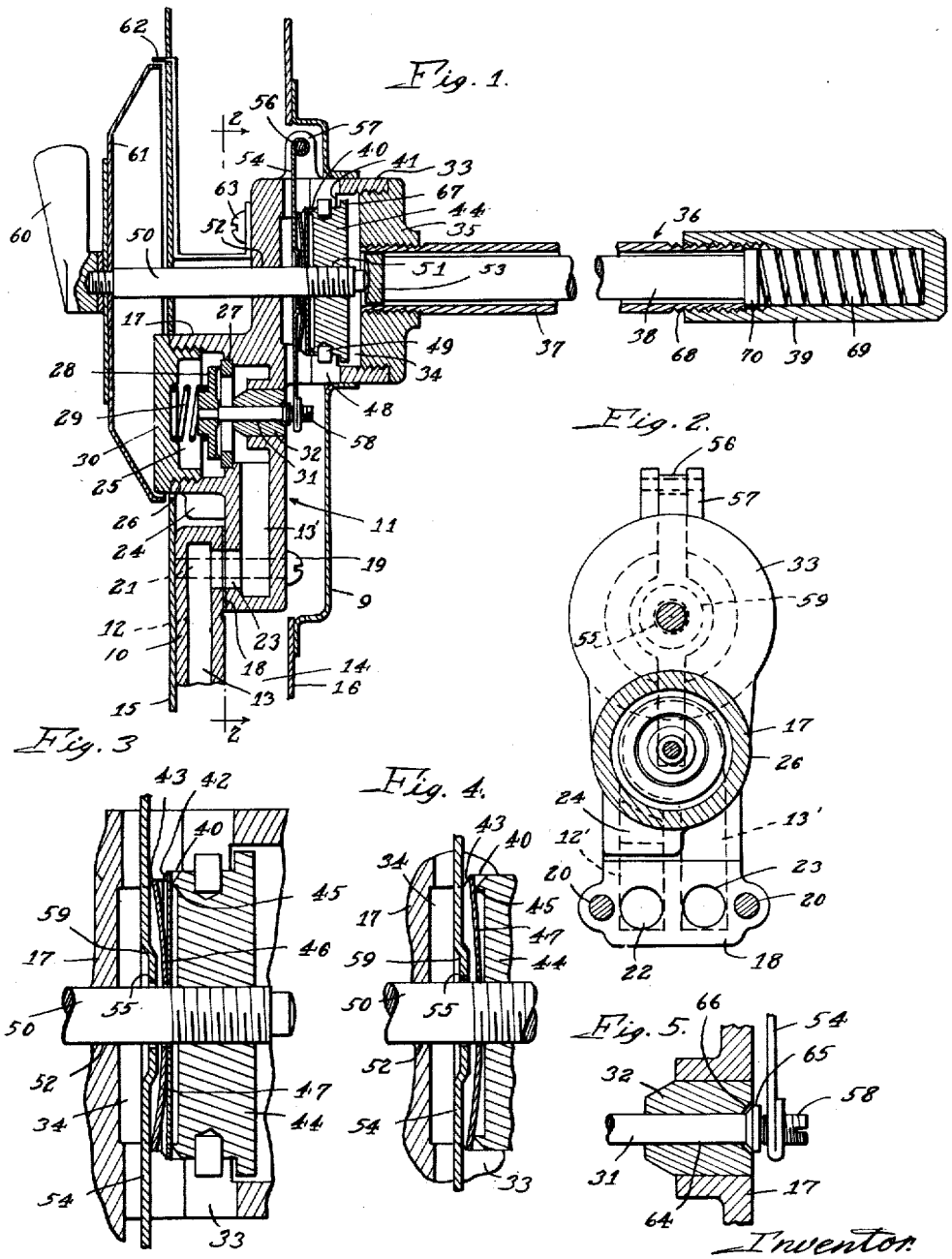

1,957,774

UNITED STATES PATENT OFFICE 1,957,774

OVEN REGULATOR

John H. Grayson, Lynwood, Calif., assignor to Grayson Heat Control, Inc., Lynwood, Calif., a corporation of California Application December 29, 1930, Serial No. 505,349

25 Claims. (Cl. 236—48)

This invention relates to automatic temperature regulating devices, and is principally concerned with a new and improved oven regulator for gas ranges.

The principal object of my invention is to provide a snap-action thermostat or heat regulator for gas heated ovens and the like, as distinguished from the present conventional graduating type regulators. This is with a view to avoiding the low flame for minimum temperatures, the valve of the snap-action type being either fully opened or closed, whereby to avoid the objections of flashing back, and poor combustion with a partially lit burner, and the odors going with such operation. Another advantage in the use of the snap-action type regulator is the elimination of the by-pass for supplying a regulated small amount of gas to the burner when the valve is closed so as to keep the flame from being completely extinguished, the elimination of the by-pass meaning simplification of the device and a consequent saving in cost, not to mention the trouble that is avoided in the matter of regulating the by-pass to suit the particular kind of gas used and the pressure at which it is supplied, and all the trouble that is avoided that was caused by the by-pass not supplying enough gas to keep the burner lit and causing the oven to fill up with gas. With a snap-action regulator it is only necessary to have a small pilot light, the same as was required with the graduating type regulators in addition to the provision of the by-pass. Numerous other advantages going with the use of the snap-action type of oven regulator will be discussed presently.

The invention contemplates various improvements, among which may be enumerated the following:

(1) The provision in connection with the snap-action valve actuator of a plunger forming a part of the actuator and operated by a thermostat in which is embodied a heavy spring between the rod and tube elements to communicate movement from the tube to the rod and thence to the plunger. The movement of the plunger is positively limited so that it is capable of enough movement to open the valve, but not enough to damage parts of the actuator, the spring in the thermostat being arranged to be simply compressed in the further movement of the thermostat for which there is no corresponding movement of the plunger.

(2) The provision of a valve body for the oven regulator in which the valve chamber is entirely separated from the chamber containing the valve actuator, the two chambers being in laterally spaced relation, and a movement amplifying lever being pivoted at one end and extending through the actuator chamber for operation by the actuator intermediate its ends, and having its free end arranged to communicate amplified movement to the valve with the snap-action of the actuator. This construction adapts the oven regulator very nicely to installation entirely concealed within the oven and mainly between the inner and outer walls of the oven, but is primarily of advantage from the standpoint that the stem to be turned in setting the regulator for a certain desired oven temperature can be extended from the valve actuator through the wall of the chamber therefor forwardly through the oven wall with a free working fit in the valve body and without the necessity for any packing about the stem, owing to the fact that the valve actuator chamber is not in communication with the valve chamber, and there is, therefore, no need to worry about gas leakage. Furthermore, the valve actuator mechanism since it does not have to be relied upon to seal the valve against gas leakage, can have the parts thereof fitting freely in the actuator chamber so as to work very easily and relieve the thermostat of an undue amount of resistance.

(3) The provision, incidental to the construction just referred to, of a guide for the valve stem having the stem working freely therein and projecting therethrough and from the valve body for operation thereof by the free end of the movement amplifying lever mentioned above, and an auxiliary valve on the projecting end of the valve stem arranged to engage a seat on the guide to prevent leakage through the guide when the valve is opened. This permits the valve stem to have a free working fit in the valve stem guide without the danger of gas leakage, and the likelihood of trouble due to sticking of the valve, that otherwise goes with having the valve fitting closely in its guide, is avoided.

The invention will be better understood as reference is made in the following specification to the accompanying drawing, in which—

Figure 1 is a longitudinal vertical section through an oven regulator made in accordance with the invention;

Fig. 2 is a front view of the valve body with the manifold removed therefrom, this view being taken on the line 2—2 of Figure 1;

Fig. 3 is an enlarged sectional detail of the valve actuator;

Fig. 4 is a similar view of an alternative construction, and

Fig. 5 is an enlarged sectional detail of the valve stem guide showing the auxiliary valve in connection with the stem.

The same reference numerals are applied to corresponding parts throughout the views.

The oven regulator herein shown is adaptable to ranges having ovens of any ordinary construction and, like the oven regulator shown in my copending application filed May 19, 1930, Serial No. 453,682, is arranged to be installed substantially entirely in the insulating chamber in the side wall of the oven. Reference may, therefore, be had to that application for particulars concerning the way in which the manifold 10, which extends downwardly from the oven regulator 11, has its inlet passage 12 connected with the oven cock and pilot light and its outlet or delivery passage 13 connected with the oven burner. The manifold 10, together with the oven regulator 11, is installed in the insulating chamber 14 between the outer and inner walls 15 and 16 of the oven. The space 14 may be an air space or may be filled with suitable insulating material. In passing, it will be observed that the regulator 11 is accessible from the inside of the oven through an opening in the inner wall 16, through which the regulator is arranged to be assembled on the manifold or removed therefrom. A cover plate 9 may be provided fitting over that portion of the regulator that projects into the oven, suitably with an ordinary friction fit, and arranged to be pressed against the wall 16 so as to close the opening therein and make for a neater appearance inside the oven.

The oven regulator 11 comprises a cast brass body 17, of elongated form, and provided with a flat face 18 at the lower end thereof onto which the upper end of the manifold 10 is arranged to be clamped, as by means of screws 19 passed through the holes 20 provided in the body from the inside of the oven and threading in holes 21 drilled and tapped in the upper end of the manifold. Registering ports are formed in the abutting faces of the manifold 10 and body 17, the port 22 in the body being arranged to communicate with the inlet passage 12 of the manifold, and the port 23 with the delivery passage 13. A gasket may be provided between the manifold 10 and body 17 to prevent leakage of gas. Passages 12' and 13' are provided in the body 17 communicating with the ports 22 and 23, respectively, and it will be observed that a hollow boss 24 is formed on the body to establish communication between the passage 12' and the valve chamber 25 formed in a hollow cylindrical boss 26 projecting from the front of the body 17 intermediate its ends. A ring 27, suitably of stainless steel, provides a valve seat in the chamber 25, and a valve 28, also preferably of stainless steel, is normally urged toward engagement with the seat by a spring 29, which bears against the valve at one end and fits at its other end in a recess in a cap 30 threaded into the boss 26 to seal the valve chamber. The valve controls communication between the chamber 25 and the passage 13', which, of course, leads to the burner. The valve has a stem 31 extending rearwardly therefrom through a guide 32, preferably in the form of a plug of stainless steel, having a press fit in a hole provided in the back wall of the body 17. The valve is accessible for cleaning by removal of the cap 30 which, as shown, projects through a hole in the outer oven wall 15. Suitable facets may be provided on the cap for application of a wrench, or, if desired, a screw driver slot may be provided thereon. The cap is covered up by the dial to which reference will be made presently, so that the appearance of the oven is not detracted from because of the cap projecting through its wall.

The valve 28, as will be described presently, is either closed or fully opened, by virtue of the fact that it is operated by a snap-action mechanism, instead of the types of mechanisms used in graduating type oven regulators. There are numerous advantages in the use of a snap-action type oven regulator, the principal one being that the low flame for minimum temperatures is eliminated. Since the valve is either closed or fully opened, there is no danger of flash backs and no danger of having a partially lit burner. The by-pass, which was required with the graduating type regulators to maintain the low flame for minimum temperatures, is, of course, eliminated in the snap-action type regulators, and it is well known that the by-pass gave rise to plenty of difficulties, owing to the fact that it was hard to regulate properly to suit the particular kind of gas used and the pressure available. Then, too, there is the advantage with a snap-action oven regulator, where the oven is insulated, that lower temperatures may be maintained without sacrificing quick heating for the high temperatures, and complete lighting of the oven burner can be definitely assured because of the fact that the burner is operated with the valve wide open, which means a larger flame and permits placing the ports in the burner closer together. The most common trouble in the use of the graduating type oven regulators was that the by-pass would be improperly adjusted and would not deliver sufficient gas to keep the burner lit, and the consequence was that the oven would fill up with gas. Then, on the other hand, if the by-pass were opened wider, the minimum temperature that could be maintained was much too high. For example, in the case of an insulated oven, it was almost impossible to get a flame low enough to maintain a minimum temperature of about 250° F. The snap-action type regulators only require a small pilot light in conjunction therewith adjacent the burner; the same as was required with the graduating type regulators, in addition to the by-pass referred to. The present invention is, therefore, unique in that it makes possible a simplification of the oven regulator and at the same time affords numerous advantages over the old constructions, as mentioned above.

The valve body 17 has a hollow cylindrical boss 33 formed integral with it at its upper end and projecting rearwardly therefrom, as shown. The chamber 34 provided therein contains the valve actuator mechanism and is closed by a plug 35 on which the thermostat 36 is mounted. The latter comprises a tube 37 of copper or other material having a high coefficient of expansion, and a rod 38 of invar or any other suitable material which is not subject to expansion or contraction with temperature change. The tube 37 threads in the plug 35, as shown, and has the rod 38 fitting inside the same and arranged to have movement communicated thereto in the expansion and contraction of the tube. The novel details of the operating connection between the tube 37 and rod 38 within the cap 39 that is threaded on the tube 37 will be described presently. The boss 33 has the bore thereof reduced, as at 40, so that an annular shoulder is formed at 41, the purpose of which will soon appear. There are still further reductions in the bore to form two other annular shoulders 42 and 43 at the other end of the bore. A plunger 44 fits slidably in the bore 40 and has an annular shoulder 45 projecting from the front face thereof for engagement with levers 46 near the outer ends of the latter, the said levers resting at their outer ends on the annular shoulder 42. A snap-over disc 47 of spring material rests at its outer edge on the shoulder 43 with the convex side thereof presented for engagement by the inner ends of the levers 46. The plunger, levers, and disc constitute a snap-action type valve actuator similar to that disclosed in my Patent #1,744,465 issued January 21, 1930. The actuator mechanism could be varied, as shown in Fig. 4, to the extent of having the plunger 44 disposed directly behind the disc 47 with the shoulder 45 engaging the convex side of the disc near the outer edge of the latter, as disclosed in my Patent #1,699,468 issued January 15, 1929. For the present purposes, these two forms of snap-action type valve actuator mechanisms may be regarded as equivalents, particularly in view of the special feature of the plunger 44 and special construction of the thermostat 36 hereinafter described. Slots 48 are provided in diametrically opposite sides of the boss 33 in which pins 49 projecting from diametrically opposite sides of the plunger 44 are slidably received, thereby serving to hold the plunger against turning in the bore 40. This permits the threading of a stem 50 in either direction in a hole 51 made in the center of the plunger. The stem 50 passes freely through a hole 52 provided in the valve body in alignment with the hole 51 and through a hole in the center of the disc 47 to thread into the hole 51. The stem extends beyond the hole 51 for engagement with a small disc 53 resting against the inner end of the rod 38 within the tube 37. It will, therefore, appear that the movement of the rod 38 is communicated through the stem 50 to the plunger 44, and it in turn communicates movement either directly to the disc 47, as shown in Fig. 4, or through the intermediary of the levers 46, as shown in Fig. 3, to move the center of the disc toward and slightly past dead center so as to snap over from the normally convexo-concave form shown to concavo-convex form. The disc 47 in the snap-action thereof, is arranged to communicate movement to the stem 31 to open the valve 28. I have illustrated a movement amplifying lever 54 for transmitting movement in an amplified degree from the disc 47 to the stem 31. This lever is disposed substantially vertically and projects diametrically through the actuator chamber 34, being provided with a hole 55 to permit the passage of the stem 50 through it, and projects through the slots 48 for pivotal connection at its upper end as at 56 between lugs 57 projecting upwardly from the boss 33, and for an operating connection at its lower end with the valve stem 31, as by means of an adjusting screw 58 threaded in the lower end thereof and engaging the projecting end of the valve stem. The screw 58 is adjusted so that the valve will be opened or closed simultaneously with the snap over of the disc. The lever 54 is necessarily of increased width substantially concentric with the hole 55 therein, and it will be observed in Fig. 3 that at this portion the lever is furthermore stamped so as to provide the embossed portion 59 concentric with the hole 55 so as to reach closer to the central portion of the disc 47 and make the lever derive the full benefit of the movement of the disc in the snap action thereof. The relationship between the disc 47 and boss 59 is such that the disc does not commence to communicate movement to the lever 54 until it has been moved slightly past dead center, and then, in the snap action of the disc, the disc communicates abrupt movement to the lever. This movement is, of course, amplified approximately 100% by reason of the way in which the lever is mounted with relation to the valve stem 31, and the valve is consequently moved to wide open position. Contrariwise, when the oven heats up, the tube 37 expands until eventually the disc 47 is no longer compressed enough by the plunger 44 to keep it in its concavo-convex form. The result is that the disc snaps back over dead center to its normal convexo-concave form, thereby releasing the lever 54 for movement by the valve stem 31 under the action of the valve spring 29. The valve 28 is, therefore, closed as abruptly as it was opened. The present device is so sensitive that a rise or drop in temperature of about 10° F. is sufficient to cause the closing or opening of the valve.

From this much description it will be seen that the oven regulator of my invention is arranged to turn the gas on fully or else entirely off, thereby affording the numerous advantages mentioned above and avoiding the disadvantages that went with the use of the graduating type oven regulators. The use of the movement amplifying lever 54 is particularly advantageous in connection with this regulator mainly for two reasons. First of all, it gives the desired valve movement without necessitating a snap-action disc of large diameter. In other words, the small movement of the snap-action disc is amplified to the desired extent simply by the use of a lever 54 of the proper length. Secondly, the use of the lever 54 permits the actuator chamber 34 to be offset in relation to the valve chamber 25 and entirely independent of and out of communication with one another. That in turn simplifies matters so far as the stem 50 is concerned, because it can be extended freely through the hole 52 without having to provide packing material, since the chamber 34 does not contain gas. Naturally, if the valve chamber 25 and actuator chamber 34 were coaxially arranged and the valve 28 were operated directly by the snap action of the disc 47, the stem 50 would have to extend through the valve stem, thus complicating the construction considerably and introducing difficulties from the standpoint of necessitating the provision of packing about the stem to prevent leakage of gas. Then, too, the fact that the actuator mechanism in the chamber 34 does not have gas on the one side thereof, avoids the necessity for the parts of the mechanism fitting closely in the chamber 34; these parts can be made to fit as freely as desired so as to work quite easily. The freely operating actuator mechanism and freely movable stem 50 relieve the thermostat of all the resistance that would otherwise have to be contended with, and there is no likelihood, therefore, of the device failing to operate or operating unsatisfactorily when in service. All those difficulties are avoided in the present construction. The stem 50 is simply extended forwardly from the plunger 44 freely through the hole 52 and through a hole in the outer oven wall 15, and has a handle 60 attached thereto, together with a dial 61 on the rim of which are graduations marked according to the oven temperatures for which the regulator is arranged to be set. A pointer 62 is provided in conjunction with the dial projecting through a small hole in the oven wall, the same constituting the extremity of an angular sheet metal bracket fastened as at 63 to the body 17. Thus, in setting the oven regulator, the handle 60 is turned to turn the dial 61 until the desired temperature is adjacent the pointer 62. In setting for higher oven temperatures, the stem 60 is, of course, screwed in, and for lower oven temperatures is unscrewed. With the method herein disclosed for setting the regulator, there is no need for a different construction of regulators for right and left hand ovens.

The valve 28, being arranged to be operated by snap action, must have its stem 31 fit quite freely in the bore 64 in the guide 32, particularly since the parts are subject to heating up to such high temperatures. This free fit could not result in gas leakage when the valve 28 is closed, because the gas is then only in the chamber 25 behind the valve, and the gas pressure aided by the spring 29 is enough to prevent gas leakage. However, when the valve is opened, there would be some likelihood of gas leakage through the bore 64 because of the free fit of the stem 31 therein, and for that reason I provide a small tapered auxiliary valve 65 directly on the rear end of the stem 31 and arranged to have a snug fit in a valve seat 66 provided in the form of a counterbore in the guide 32 at the rear end of the bore 64. As the valve 28 is opened, the auxiliary valve 65 is seated, thereby positively preventing leakage of gas through the bore 64.

I shall now describe what I consider a very important feature of this oven regulator, namely, the spring safety feature of the thermostat 36. Reference was made above to the annular shoulder 41 in the valve actuator chamber 34. It should now be observed that the plunger 44 has an annular flange or rim portion 67 arranged to seat on the shoulder 41. This is to limit the movement of the plunger 44 toward the disc 47 so that it can have enough movement to snap the disc over dead center, but not enough to damage the disc or the levers 47 provided in connection with the disc. This limiting of the movement of the plunger 44 is important because of the wide range of temperatures dealt with in an oven heat regulator such, for example, as from 200° to 550° F., that amount of temperature change being enough to cause an expansion of the tube 37 approximately .050" in the case of a tube 13" long, which is the usual length. In other words, the amount of movement which it would be possible to communicate to the plunger 44 in the normal expansion and contraction of the tube 37 is more than what is required to take care of the snap action of the disc 47, and in order to avoid damaging the disc by excessive movement of the plunger, the movement of the plunger is limited by engagement of the flange 67 with the shoulder 41. This, however, necessitates special construction of the thermostat 36 so that the further movement of the thermostat for which there can be no movement of the plunger will be taken care of. I have provided the cap 39 of elongated form threading, as indicated at 68, over the end of the tube 37. A heavy coiled compression spring 69 is disposed within the cap 39, the cap constituting an abutment for the outer end of the spring, and a small disc 70 providing an abutment for the inner end thereof. The disc 70, it will be noticed, is arranged normally to bear against the end of the tube 37 in addition to bearing against the end of the rod 38 therein. The spring 69 is so heavy that there is no compression of it in the movement of the plunger 44 by the thermostat and it is not arranged to be compressed until the plunger is stopped by reason of engagement of the flange 67 with the shoulder 41. For example, assuming that 60# pressure is required to operate the actuator mechanism, the spring 69 should be an 80# or 100# spring so that there will be no "give" in the spring excepting under extreme conditions, as for example, where the regulator is set to one of the highest temperatures, says around 550° F. Naturally, if the oven is at room temperature when the regulator is being set, the turning of the stem 50 will immediately move the plunger 44 enough to snap the disc 47 over dead center to open the valve and the further turning of the stem, following the seating of the flange 67 on the shoulder 41, will cause the disc 70 to be unseated from the end of the tube 37 and the spring 69 to be compressed. When the oven heats up and the tube 37 expands, the compression of the spring is first relieved to the extent of allowing the disc 70 to move back to its seat, and following that, the rod 38 relieves the plunger 44 of pressure until finally, when the tube 37 has expanded far enough, the disc 47 is allowed t snap back to its normal convexo-concave form so as to permit the valve 28 to close. The cap 39 can, of course, be adjusted on the tube 37, by reason of the threaded connection at 68, so as to place the spring 69 under the proper load. It is no doubt clear from this description that there is no possible danger of damaging the rather frail parts of the actuator by reason of excessive movement of the thermostat.

It is believed the foregoing description conveys a good understanding of all of the objects and advantages of my invention. The appended claims have been drawn with a view to covering all legitimate modifications and adaptations.

I claim:

1. In a fuel control system, a hollow walled oven having fuel conducting means concealed between the walls thereof, heat responsive means within the oven, a control casing for said heat responsive means having one portion thereof disposed between the walls of the oven and having direct detachable connection therein with the fuel conducting means, a valve in said portion controlling the flow of fuel through the fuel conducting means, said casing having another portion thereof projecting into the oven and having the heat responsive means carried thereon, and means in the last mentioned portion of said casing providing an operating connection between the heat responsive means and the valve in the other portion.

2. In a fuel control system, a hollow walled oven having fuel conducting means concealed between the walls thereof, heat responsive means within the oven, a control casing for said heat responsive means having one portion thereof disposed between the walls of the oven and having direct detachable connection therein with the fuel conducting means, a valve in said portion controlling the flow of fuel through the fuel conducting means, said casing having another portion thereof projecting into the oven and having the heat responsive means carried thereon, and means in the last mentioned portion of said casing providing an operating connection between the heat responsive means and the valve in the other portion, said casing being bodily removable from within the oven when detached from the fuel conducting means leaving said fuel conducting means in position between the oven walls.

3. In a fuel control system, a hollow walled oven having fuel conducting means concealed between the walls thereof, a control casing for said heat responsive means having one portion thereof disposed between the walls of the oven and communicating with the fuel conducting means, a valve in said portion controlling the flow of fuel through the fuel conducting means, said casing having another portion thereof projecting into the oven and having the heat responsive means carried thereon, and means in the last mentioned portion of said casing providing an operating connection between the heat responsive means and the valve in the other portion, the said valve being removable from the first mentioned portion of the casing from the outside of the oven with the casing in position between the oven walls.

4. In a fuel control system, a hollow walled oven having fuel conducting means therefor, heat responsive means within the oven, a control casing for said heat responsive means having one portion thereof formed to provide a valve chamber, said portion communicating with the fuel conducting means, a valve in the valve chamber controlling the flow of fuel through the fuel conducting means, said casing having another portion formed to provide an actuator chamber disposed in laterally offset relation to the valve chamber, the latter portion of said casing having the heat responsive means carried thereon, snap action valve actuating mechanism in said actuator chamber operatively connected to the heat responsive means so as to amplify its movement, and a movement amplifying fulcrum lever pivotally mounted on said casing and providing an operating connection for further movement amplification between the actuator mechanism and the valve, said lever being movable by the actuator mechanism and being arranged to communicate amplified movement to said valve.

5. In a fuel control system, a hollow walled oven having fuel conducting means concealed between the walls thereof, heat responsive means within the oven, a control casing for said heat responsive means having one portion thereof formed to provide a valve chamber, said portion being disposed between the oven walls and communicating with the fuel conducting means, a valve in the valve chamber controlling the flow of fuel through the fuel conducting means, said casing having another portion formed to provide an actuator chamber disposed in laterally offset relation to the valve chamber, the latter portion of said casing projecting into the oven and having the heat responsive means carried thereon, valve actuating mechanism in said actuator chamber operatively connected to the heat responsive means, and a movement amplifying lever projecting from the actuator chamber toward the valve chamber, said lever being pivoted at one end and arranged to have movement communicated thereto intermediate its ends by the actuator mechanism whereby to communicate amplified movement to the free end of said lever, the free end of said lever being arranged to communicate movement to the valve.

6. A structure as set forth in claim 4 including a setting stem providing a threaded adjustment between the heat responsive means and the valve actuator mechanism in the actuator chamber, said stem reaching directly forwardly from the actuator chamber through the outer wall of the oven and having means on the outer end thereof for turning the same, suitably according to the graduations of a temperature scale.

7. A structure as set forth in claim 4 wherein the valve is removable from the valve chamber directly from the outside of the oven with the casing in position between the oven walls, the structure including a cap for the valve chamber removable from the outside of the oven, and said structure further including a setting stem providing a threaded adjustment between the heat responsive means and the actuator mechanism in the actuator chamber, said stem projecting forwardly directly from the actuator chamber through the outer wall of the oven alongside that portion of the casing wherein the valve chamber is provided, and means on the outer end of said stem for turning the same, suitably according to the graduations of a temperature scale.

8. A structure as set forth in claim 4 wherein the valve is removable from the valve chamber directly from the outside of the oven with the casing in position between the oven walls, the structure including a cap for the valve chamber removable from the outside of the oven, and said structure further including a setting stem providing a threaded adjustment between the heat responsive means and the actuator mechanism in the actuator chamber, said stem projecting forwardly directly from the actuator chamber through the outer wall of the oven alongside that portion of the casing wherein the valve chamber is provided, and a dial fitting about the outer end of said stem and concealing the cap for the valve chamber, said dial permitting the setting of the stem according to a temperature scale, and being removable from its normal operative position to afford access to the cap.

9. In a fuel control system, an oven having fuel conducting means for the burner thereof concealed between the walls of said oven, heat responsive means within the oven, and an oven heat regulator comprising a casing disposed mainly between said oven walls and communicating with said fuel conducting means, said casing providing a valve chamber therein, a valve in said chamber controlling the flow of fuel through the fuel conducting means, said casing having one portion reaching into the oven providing an actuator chamber therein, valve actuator mechansm in said chamber operatively connected with the heat responsive means, said mechanism including a part arranged to be snapped over dead center, and means providing an operating connection between said mechanism and said valve whereby the valve in the valve chamber is arranged to be operated abruptly in the snap action of said part.

10. In a thermostatic device of the character described, the combination with a thermostatic element arranged to move upon temperature change, of a valve or other device arranged to be operated according to temperature change, a snap-action over center element of spring material, a plunger arranged to be moved by the thermostatic element and arranged to move the snap-action element over dead center, the snap-action element and valve being disposed in laterally spaced relation to one another, a movement amplifying lever pivotally supported at one end and arranged to have movement communicated thereto intermediate its ends by the snap-action element, said lever having its free end arranged to communicate movement to the valve, and a screw adjustment in the operating connection between the free end of the lever and the valve, the same being arranged to be adjusted so that movement is communicated to the valve at the instant of the snap action of the snap-action element.

11. In a thermostatic device of the character described, the combination with a thermostatic element arranged to move upon temperature change, of a valve or other device arranged to be operated according to temperature change, a snap-action over center element of spring material, a plunger arranged to be moved by the thermostatic element and arranged to move the snap-action element over dead center, the snap-action element and valve being disposed in laterally spaced relation to one another, a movement amplifying lever pivotally supported at one end and arranged to have movement communicated thereto intermediate its ends by the snap-action element, said lever having its free end arranged to communicate movement to the valve, and a setting stem threaded in the plunger and providing an adjustable operating connection between the thermostatic element and the plunger, said stem being arranged to be adjusted according to the graduations of a temperature scale.

12. In a thermostatic device of the character described, the combination of a body member, a tube having a rod mounted therein to form a thermostat, the tube being fixed on the body and arranged to communicate endwise movement to the rod in the event of temperature change, a valve or other device to be operated according to temperature change mounted in one portion of said body, said valve having a stem for operating the same projecting from that portion of the body, spring means normally holding the valve closed, a spring diaphragm disc of substantially convexo-concave form supported loosely about its outer edge in another portion of said body with the center thereof spaced laterally from the projecting end of the valve stem, a plunger guided for movement in the last mentioned portion of the body, the same being arranged to have movement communicated thereto by the thermostat rod and being arranged to force the disc over dead center to concavo-convex form, and a movement amplifying lever pivotally supported at one end on the last mentioned portion of the body and arranged to have movement communicated thereto intermediate its ends by the central portion of the disc and to communicate movement to the projecting end of the valve stem by its free end.

13. A device as set forth in claim 12 including a setting stem threaded in the plunger and projecting therethrough so as to provide an adjustable operating connection between the plunger and rod, said stem being arranged to be turned according to the graduations of a temperature scale, the said plunger being held against turning in the body whereby to permit threaded adjustment of the stem relative thereto.

14. A device as set forth in claim 12 including means for limiting the movement of the plunger toward the disc to prevent damaging the disc, and yielding means to permit movement of the thermostat independently of the plunger when the latter is held against movement.

15. In a device as set forth in claim 12 wherein the two portions of the body referred to, namely, the portion constituting a valve chamber and the portion constituting an actuator chamber, are entirely separated from one another so that the actuator chamber does not contain the gas or other fluid contained in the valve chamber, the said device including a setting stem threaded in the plunger in the actuator chamber and providing an adjustable operating connection between the plunger and the thermostat rod, said stem projecting freely through a hole in the body from the actuator chamber and being arranged to be turned suitably according to the graduations of a temperature scale.

16. A device as set forth in claim 12 wherein the valve stem projects freely through a guide opening provided therefor in the body, the device including an auxiliary valve on the projecting end of the valve stem, and a valve seat therefor on said body arranged to be engaged by the auxiliary valve in the movement of the stem to open the main valve.

17. In a thermostatic device of the character described, the combination with a thermostatic element arranged to move upon temperature change, of a valve or other device arranged to be operated according to temperature change, a snap-action over center element of spring material, a plunger arranged to be moved by the thermostatic element and arranged to move the snap-action element over dead center, the snap-action element and valve being disposed in laterally spaced relation to one another, a movement amplifying lever pivotally supported at one end and arranged to have movement communicated thereto intermediate its ends by the snap-action element, said lever having its free end arranged to communicate movement to the valve, means for limiting the movement of the plunger toward the disc to prevent damaging the latter, and yielding means to permit movement of the thermostat independently of the plunger when the latter is held against movement.

18. In a thermostatic device of the character described, the combination with a thermostatic element arranged to move according to temperature variations, of a valve or other element arranged to be operated, a snap-action disc of spring material, means for supporting said disc about the edge thereof, movement amplifying means between the thermostatic element and the disc to move the center of the disc over neutral to reverse curvature, the disc and valve being disposed with their axes in laterally spaced relation to one another, and a fulcrum lever adapted for abrupt movement by the disc and to amplify its movement, said lever being pivotally supported at one end and arranged to have movement communicated thereto intermediate its ends from the central portion of said disc, said lever having its free end arranged to communicate movement to the valve.

19. A device as set forth in claim 18 including a screw adjustment in the operating connection between the free end of the lever and the valve, the same being arranged to be adjusted so that movement is communicated to the valve at the instant of the snap action of the disc.

20. In a thermostatic device of the character described, the combination of a body member, a tube having a rod mounted therein to form a thermostat, the tube being fixed on the body and arranged to communicate endwise movement to the rod in the event of temperature change, a valve or other device to be operated according to temperature change mounted in one portion of said body, said valve having a stem for operating the same projecting from that portion of the body, spring means normally holding the valve closed, a spring diaphragm disc of substantially convexo-concave form supported loosely about its outer edge in another portion of said body with the center thereof spaced laterally from the projecting end of the valve stem, movement amplifying means in the last mentioned portion of the body operable by the thermostat rod to force the center of the disc past neutral to reverse curvature, and a fulcrum lever adapted for abrupt movement by the disc and to amplify its movement, said lever being pivotally supported at one end on the last mentioned portion of the body and arranged to have movement communicated thereto intermediate its ends from the central portion of the disc and to communicate movement to the projecting end of the valve stem by its free end.

21. In a thermostatic device of the character described, the combination with a thermostatic element arranged to move according to temperature variations, of a valve or other element arranged to be operated, a movement amplifying disc of spring material, means for supporting said disc about the edge thereof, a plunger arranged to be moved by the thermostatic element and arranged to move the disc over dead center, means for limiting the movement of the plunger toward the disc to prevent damage thereof, the valve or other element to be operated being operable in the snap action of the disc, and a setting stem threaded in the plunger and providing an adjustable operating connection between the thermostatic element and the plunger, said stem being arranged to be adjusted according to the graduations of a temperature scale.

22. In a thermostatic device of the character described, the combination with a thermostatic element arranged to move according to temperature variations, of a valve or other element arranged to be operated, a movement amplifying disc of spring material, means for supporting said disc about the edge thereof, a plunger arranged to be moved by the thermostatic element and arranged to move the disc over dead center, one or more resilient levers disposed radially with respect to the disc and plunger, supported at their outer ends for oscillatory movement between the disc and plunger and having engagement at their inner ends with the central portion of the disc, the plunger having engagement with said levers near their outer ends, and means for limiting the movement of the plunger toward the disc to prevent damaging of the disc or levers, the valve or other element to be operated being operable in the snap action of the disc.

23. In a thermostatic device of the character described, the combination with a thermostatic element arranged to move according to temperature variations, of a valve or other element arranged to be operated, a movement amplifying disc of spring material, means for supporting said disc about the edge thereof, a plunger arranged to be moved by the thermostatic element and arranged to move the disc over dead center, means for limiting the movement of the plunger toward the disc to prevent damage thereof, the valve or other element to be operated being operable in the snap action of the disc, and yielding means to permit movement of the thermostat independently of the plunger when the latter is held against movement.

24. A device as set forth in claim 22 including yielding means to permit movement of the thermostat independently of the plunger when the latter is held against movement.

25. In a thermostatic device of the character described, the combination with a thermostat element arranged to move upon temperature change, of a valve or other device arranged to be operated according to temperature change, a snap-action over center element of spring material, means for supporting said element, a plunger arranged to be moved by the thermostatic element and arranged to move said snap-action element over dead center, means for positively limiting the movement of the plunger toward the snap-action element, the valve or other element to be operated being operable in the snap-action of said snap-action element, and a setting stem threaded in the plunger and providing an adjustable operating connection between the thermostatic element and the plunger, said stem being arranged to be adjusted according to the graduations of a temperature scale.

JOHN H. GRAYSON.

DISCLAIMER 1,957,774.—*John H. Grayson*, Lynwood, Calif. OVEN REGULATOR. Patent dated May 8, 1934. Disclaimer filed June 4, 1943, by the assignee, *Grayson Heat Control, Ltd.*
Hereby enters this disclaimer to claims 10, 11, 18, and 19 of said specification.
[*Official Gazette July 13, 1943.*]

concave form supported loosely about its outer edge in another portion of said body with the center thereof spaced laterally from the projecting end of the valve stem, movement amplifying means in the last mentioned portion of the body operable by the thermostat rod to force the center of the disc past neutral to reverse curvature, and a fulcrum lever adapted for abrupt movement by the disc and to amplify its movement, said lever being pivotally supported at one end on the last mentioned portion of the body and arranged to have movement communicated thereto intermediate its ends from the central portion of the disc and to communicate movement to the projecting end of the valve stem by its free end.

21. In a thermostatic device of the character described, the combination with a thermostatic element arranged to move according to temperature variations, of a valve or other element arranged to be operated, a movement amplifying disc of spring material, means for supporting said disc about the edge thereof, a plunger arranged to be moved by the thermostatic element and arranged to move the disc over dead center, means for limiting the movement of the plunger toward the disc to prevent damage thereof, the valve or other element to be operated being operable in the snap action of the disc, and a setting stem threaded in the plunger and providing an adjustable operating connection between the thermostatic element and the plunger, said stem being arranged to be adjusted according to the graduations of a temperature scale.

22. In a thermostatic device of the character described, the combination with a thermostatic element arranged to move according to temperature variations, of a valve or other element arranged to be operated, a movement amplifying disc of spring material, means for supporting said disc about the edge thereof, a plunger arranged to be moved by the thermostatic element and arranged to move the disc over dead center, one or more resilient levers disposed radially with respect to the disc and plunger, supported at their outer ends for oscillatory movement between the disc and plunger and having engagement at their inner ends with the central portion of the disc, the plunger having engagement with said levers near their outer ends, and means for limiting the movement of the plunger toward the disc to prevent damaging of the disc or levers, the valve or other element to be operated being operable in the snap action of the disc.

23. In a thermostatic device of the character described, the combination with a thermostatic element arranged to move according to temperature variations, of a valve or other element arranged to be operated, a movement amplifying disc of spring material, means for supporting said disc about the edge thereof, a plunger arranged to be moved by the thermostatic element and arranged to move the disc over dead center, means for limiting the movement of the plunger toward the disc to prevent damage thereof, the valve or other element to be operated being operable in the snap action of the disc, and yielding means to permit movement of the thermostat independently of the plunger when the latter is held against movement.

24. A device as set forth in claim 22 including yielding means to permit movement of the thermostat independently of the plunger when the latter is held against movement.

25. In a thermostatic device of the character described, the combination with a thermostat element arranged to move upon temperature change, of a valve or other device arranged to be operated according to temperature change, a snap-action over center element of spring material, means for supporting said element, a plunger arranged to be moved by the thermostatic element and arranged to move said snap-action element over dead center, means for positively limiting the movement of the plunger toward the snap-action element, the valve or other element to be operated being operable in the snap-action of said snap-action element, and a setting stem threaded in the plunger and providing an adjustable operating connection between the thermostatic element and the plunger, said stem being arranged to be adjusted according to the graduations of a temperature scale.

JOHN H. GRAYSON.

DISCLAIMER 1,957,774.—*John H. Grayson*, Lynwood, Calif. OVEN REGULATOR. Patent dated May 8, 1934. Disclaimer filed June 4, 1943, by the assignee, *Grayson Heat Control, Ltd.*

Hereby enters this disclaimer to claims 10, 11, 18, and 19 of said specification.

[*Official Gazette July 13, 1943.*]